(12) United States Patent
Riedy et al.

(10) Patent No.: US 7,152,831 B2
(45) Date of Patent: Dec. 26, 2006

(54) CONDUIT SUPPORT

(75) Inventors: Charles H. Riedy, Lakewood, OH (US); Robert M. Gudin, Willoughby, OH (US); Eric G. Hull, Madison, OH (US)

(73) Assignee: The Lamson & Sessions Co., Cleveland, OH (US)

(*) Notice: Subject to any disclaimer, the term of this patent is extended or adjusted under 35 U.S.C. 154(b) by 0 days.

(21) Appl. No.: 10/995,999

(22) Filed: Nov. 23, 2004

(65) Prior Publication Data

US 2006/0108481 A1 May 25, 2006

(51) Int. Cl.
*F16L 3/22* (2006.01)

(52) U.S. Cl. .................. 248/68.1; 248/71; 248/74.2

(58) Field of Classification Search .............. 248/68.1, 248/71, 73, 74.1, 74.2, 316.1, 316.7; 24/531, 24/561, 562, 564
See application file for complete search history.

(56) References Cited

U.S. PATENT DOCUMENTS

| | | | | |
|---|---|---|---|---|
| 593,978 A * | 11/1897 | Boehm | .................. | 224/462 |
| 1,398,519 A * | 11/1921 | Hosch | .................. | 248/316.7 |
| 1,906,874 A * | 5/1933 | Platt | .................. | 24/457 |
| 2,007,574 A * | 7/1935 | Lang | .................. | 248/167 |
| 3,003,736 A * | 10/1961 | Hofgesang | .................. | 248/229.26 |
| 3,338,540 A * | 8/1967 | Barish | .................. | 248/212 |
| 3,363,864 A | 1/1968 | Olgreen | .................. | 248/68 |
| 4,215,838 A * | 8/1980 | Gullota | .................. | 248/121 |
| 4,244,542 A | 1/1981 | Mathews | .................. | 248/49 |
| 4,470,622 A | 9/1984 | Pate et al. | .................. | 285/419 |
| 4,524,999 A | 6/1985 | Pate et al. | .................. | 285/158 |
| D281,393 S | 11/1985 | Karnhag et al. | .................. | D8/373 |
| 4,564,163 A | 1/1986 | Barnett | .................. | 248/71 |
| 4,647,074 A | 3/1987 | Pate et al. | .................. | 285/64 |
| 4,805,479 A * | 2/1989 | Brightwell | .................. | 74/502.4 |
| 4,829,145 A | 5/1989 | Mitchell et al. | .................. | 174/65 G |
| D363,977 S | 11/1995 | Streit | .................. | D23/263 |
| 5,542,209 A * | 8/1996 | Sheu | .................. | 47/44 |
| 5,677,513 A * | 10/1997 | Ito et al. | .................. | 174/72 A |
| 5,688,428 A | 11/1997 | Maguire | .................. | 249/91 |
| 5,697,129 A * | 12/1997 | Newville | .................. | 24/339 |
| 6,595,473 B1 | 7/2003 | Aoki et al. | .................. | 248/74.4 |
| 6,622,976 B1 * | 9/2003 | Ianello | .................. | 248/73 |
| 6,945,735 B1 * | 9/2005 | Doverspike | .................. | 405/184.4 |

* cited by examiner

*Primary Examiner*—Korie Chan
(74) *Attorney, Agent, or Firm*—Jones Day (57) ABSTRACT

A bracket for supporting electrical nonmetallic tubing has axially aligned large and small spring clips for receiving and retaining large and small diameter tubing. A plurality of side-by-side pairs of the spring clips are arranged with the large and small spring clips in one pair reversely positioned relative to the large and small spring clips in an adjacent pair. Some clips are configured for attaching ties thereto that extend over a tube to hold the tube in the clip. The bracket has support legs for engaging a support surface, and fastener receiving extensions for attaching the bracket to the support surface.

23 Claims, 10 Drawing Sheets

CONDUIT SUPPORT

BACKGROUND

This application relates to the art of supports and, more particularly, to supports for supporting cylindrical conduit. The application particularly concerns a support for supporting electrical nonmetallic tubing in poured concrete construction and will be described with specific reference thereto. However, it will be appreciated that the support can be used for supporting other types of conduit in other environments, and that certain features of the support may be used for supporting items other than conduit.

Electrical nonmetallic tubing, which commonly is referred to as ENT tubing, is positioned in spaced relationship to surfaces of concrete forms that are used to form walls or floors. Relatively soft twistable wire frequently is used for attaching the ENT tubing to reinforcing bars located above horizontal concrete floor forms or within the space between concrete wall forms. This is very labor intensive, and it would be desirable to provide a more efficient way of positioning and holding ENT tubing in spaced relationship to surfaces of concrete forms.

SUMMARY

A conduit support in accordance with the present application is molded in one-piece of plastic material and includes retaining structures for retaining conduit thereon. In one arrangement, the retaining structure is in the form of generally U-shaped spring clips that hold a conduit positioned therein.

In accordance with another aspect of the application, a projection at the bottom of a spring clip pair is received within an external circumferential groove in a corrugated ENT tube to prevent longitudinal movement of the ENT tube relative to the support.

The support has a plurality of pairs of spring clips located side-by-side, and each pair of spring clips includes longitudinally aligned large and small spring clips. Adjacent pairs of spring clips are reversely positioned so that a large spring clip in one pair is adjacent small spring clips in adjacent pairs, and the small spring clip in the one pair is adjacent large spring clips in the adjacent pairs.

The spring clips have opposite spring arms with end portions that extend inwardly to better retain a conduit within the spring arms. The spring arm end portions also have outwardly and upwardly inclined portions that provide upwardly facing cam surfaces for camming the spring arms apart when a conduit is pressed against the cam surfaces.

In another arrangement, the spring arms on the spring clips are configured for attaching a connecting device thereto. The connecting device may be a cable tie or a twisted wire that pulls the spring arms together and spans the spring arms above a conduit that is received therein to hold the conduit against displacement.

The end portions of the spring arms on the spring clips are configured for providing essentially straight across connection of the spring arms without having to curve the tie or other connecting element over and across the top of a large conduit that is held between the spring arms.

The support has support legs extending therefrom in an opposite direction from the spring clips. The support legs are positionable against the inside surface of a concrete form for locating the spring clips and conduit held thereby at a desirable spacing relative to the inside surface of the form. The support may be molded with support legs of different lengths for use with walls or floors of different thicknesses so that conduit that is retained in the spring clips will be located around the middle of a floor or wall thickness or at any desired other location.

The support has fastener receiving projections extending outwardly from opposite ends thereof for receiving fasteners, such as nails or screws, to attach the support against an inner surface of a concrete form. The bottom ends of the attachment projections preferably lie in a common plane with the ends of the support legs.

Each pair of spring clips is configured for receiving and retaining either one-half inch, three-quarter inch or one inch trade size ENT tubing. However, it will be recognized that the spring clips may have other sizes, and may be sized and structurally configured for retaining other items.

DESCRIPTION OF EMBODIMENTS

Referring now to the drawings, wherein the showings are for purposes of illustrating representative embodiments of the conduit support only and not for purposes of limiting same, the FIGS. show a conduit support A that is molded in one-piece of plastic material.

Support A includes a generally flat base 10 having a plurality of conduit retaining structures spaced therealong. In the arrangement shown, there are three conduit retaining structures, each in the form of a pair of longitudinally aligned large and small generally U-shaped spring clips.

A central pair of longitudinally aligned spring clips includes large spring clip 12 and small spring clip 14. One outer pair of longitudinally aligned spring clips includes large spring clip 18 and small spring clip 20. An opposite outer pair of longitudinally aligned spring clips includes large spring clip 24 and small spring clip 26.

Each large spring clip in each pair of spring clips has the same size and configuration. Likewise, each small spring clip in each pair of spring clips has the same size and configuration. However, it will be recognized that other arrangements are possible. The spring clip pairs are arranged so that large spring clip 12 in the center pair is adjacent to small spring clips 20 and 26 in the outer pairs. Small spring clip 14 in the center pair is adjacent to large spring clips 18 and 24 in the outer pairs. In other words, adjacent pairs of spring clips are reversely positioned so that a large spring clip in one pair is adjacent small spring clips in adjacent pairs, and the small spring clip in the one pair is adjacent large spring clips in the adjacent pairs.

Large spring clip 18 has a generally flat base with a pair of spaced-apart resilient spring arms 18a, 18b that curve upwardly from the bottom and then extend generally parallel to one another. Arms 18a, 18b curve inwardly toward one another adjacent their end portions to narrow the entrance opening to the space between the arms so that the entrance opening is smaller than the diameter of a large conduit to be held between the spring arms.

Arms 18a, 18b terminate in outwardly and upwardly inclined end portions 18c, 18d that provide upwardly facing cam surfaces to facilitate insertion of a conduit between spring arms 18a, 18b. The cam surfaces are located at opposite sides of the entrance opening to a spring clip. It will be recognized that large spring clips 12 and 24 have the same configuration.

Small spring clip 26 has a generally flat base with a pair of spaced-apart resilient spring arms 26a, 26b that are curved outwardly from the bottom and then inwardly toward one another for narrowing the width of the entrance opening so that the entrance opening is smaller than the diameter of small and medium diameter conduit to be held between the spring arms. Spring arms 26a, 26b terminate in outwardly and upwardly inclined end portions 26c, 26d that provide upwardly facing cam surfaces on opposite sides of the entrance opening to facilitate insertion of a conduit between spring arms 26a, 26b. It will be recognized that small spring clips 14 and 20 have the same configuration.

Figure 1:
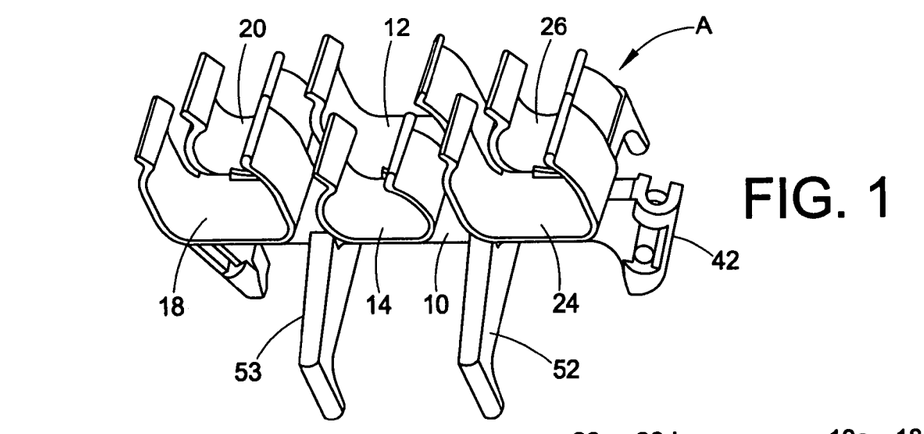
FIG. 1 is a perspective illustration of a conduit support in accordance with the present application.
Figure 2:
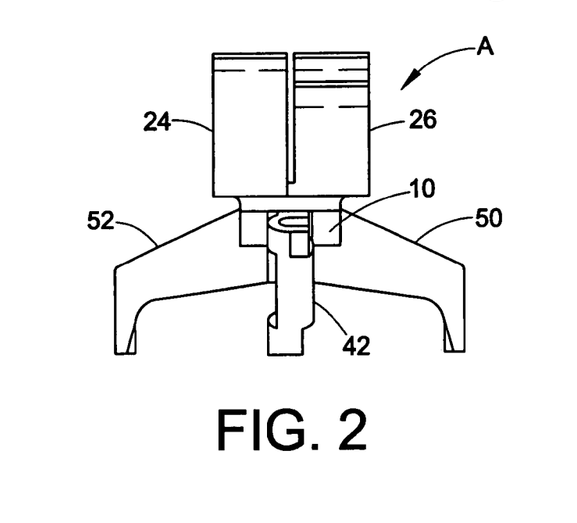
FIG. 2 is an end elevational view thereof.
Figure 3:
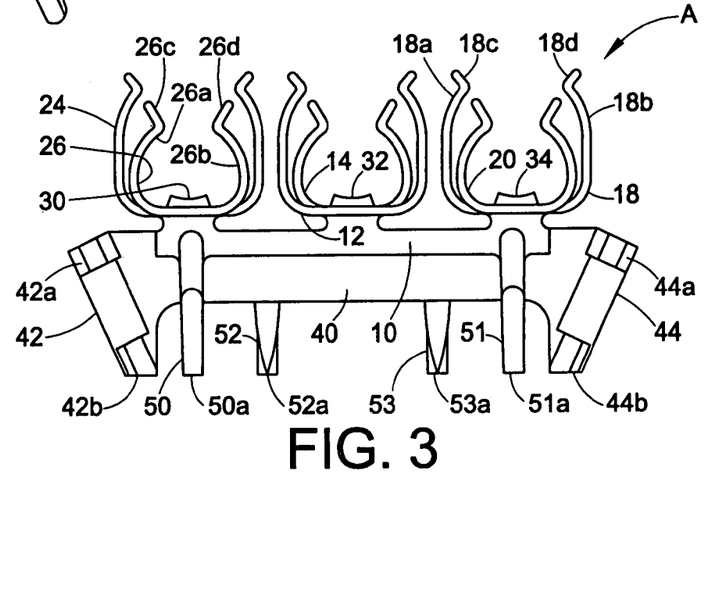
FIG. 3 is a front elevational view thereof.
Figure 4:
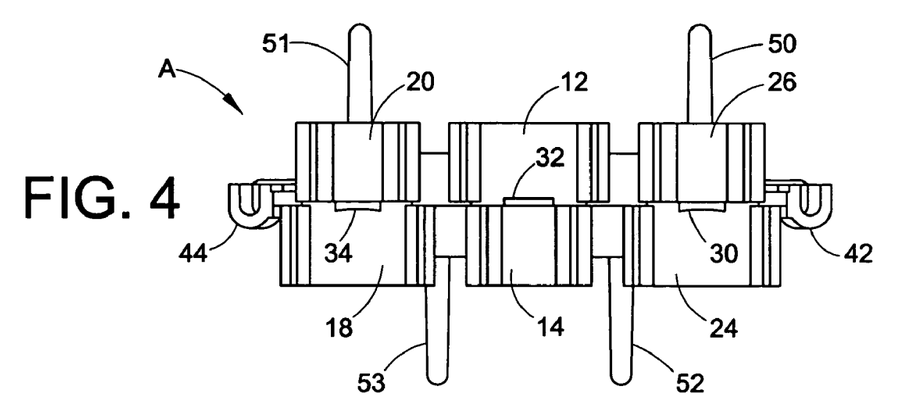
FIG. 4 is a top plan view thereof.
Figure 5:
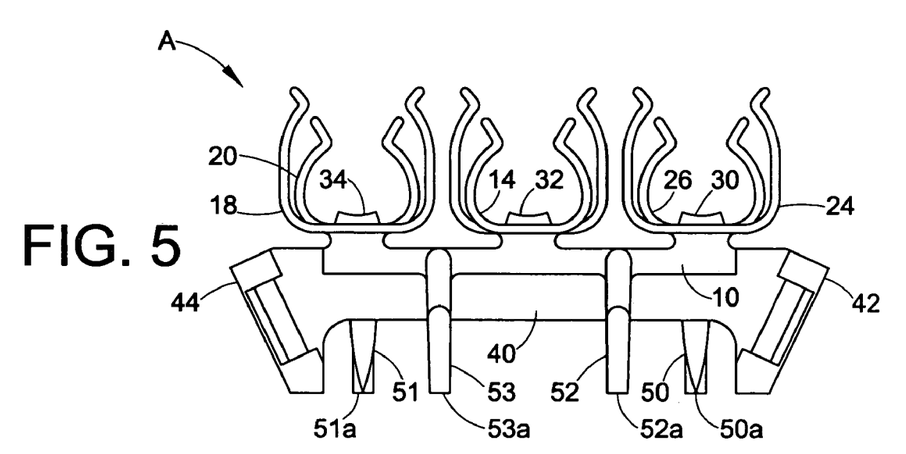
FIG. 5 is an elevational view similar to FIG. 3 from the opposite side of the support.
Figure 6:
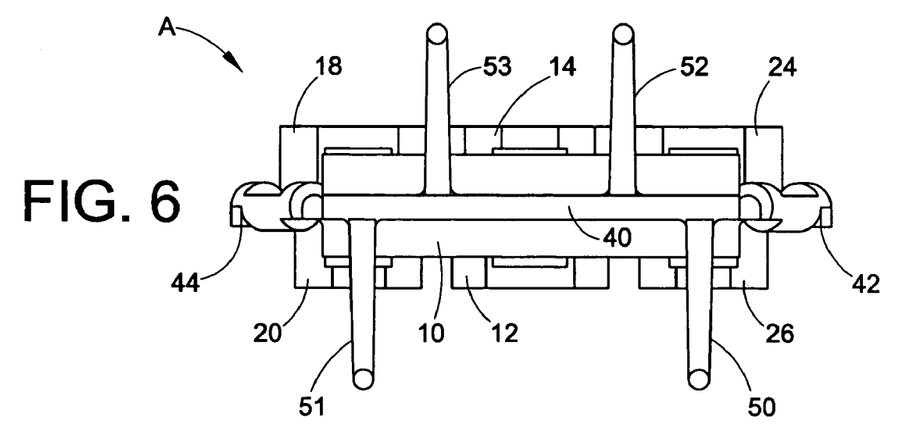
FIG. 6 is a bottom plan view thereof.
Figure 9:
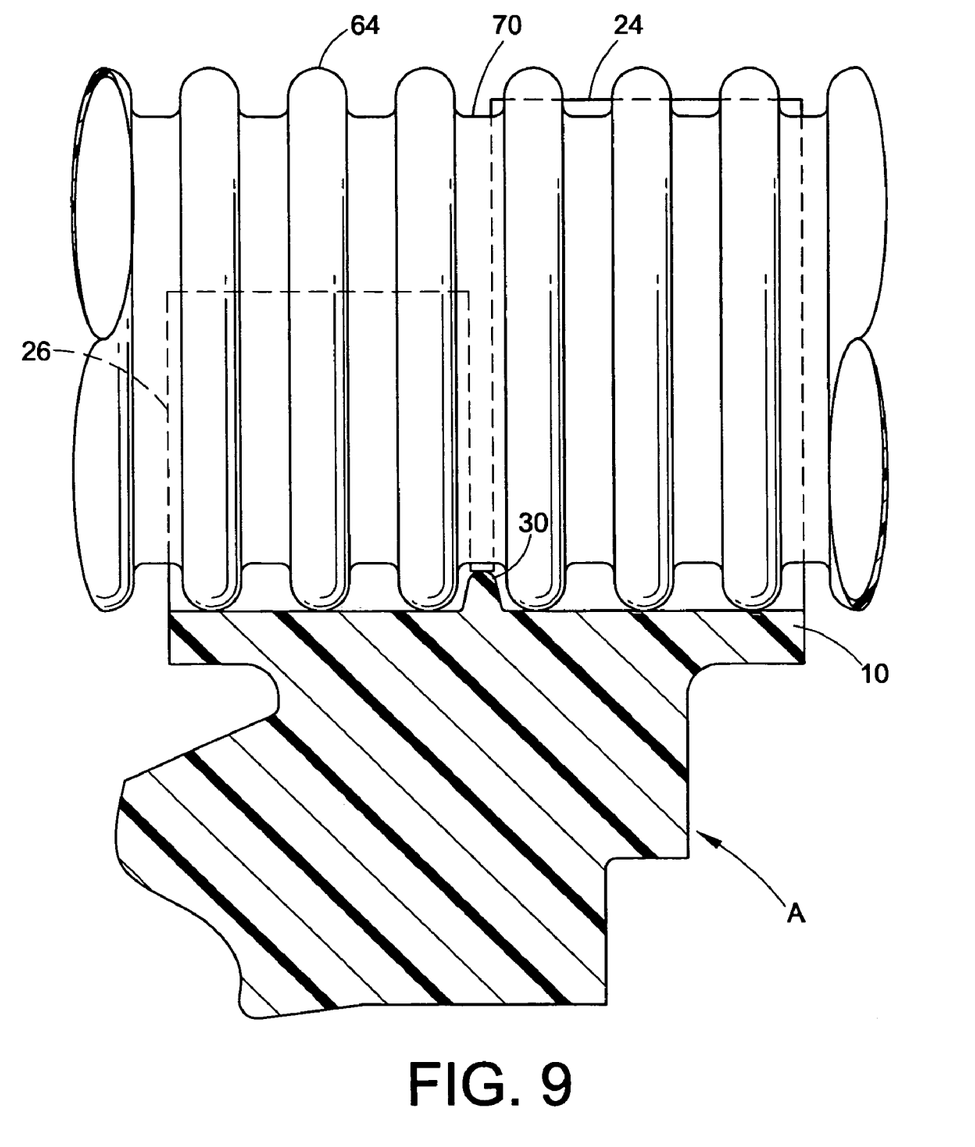
FIG. 9 is a partial cross-sectional elevational view taken generally on line 9—9 of FIG. 7.

A projection 30, 32 and 34 extends upwardly at the intersection between the bottoms of each large and small spring clip. As best shown in FIG. 9 for projection 30, the projections have the general shape of an isosceles triangle in a side or cross-sectional view. The projections also may be said to have a generally inverted V-shaped configuration with a smoothly rounded point. Each projection extends upwardly out of the plane in which the generally flat bases of the spring clips lie. Each projection also may terminate in an arcuate end surface that is curved to generally correspond with the curvature of a conduit to be received in the spring clips as shown in FIGS. 3 and 5.

A bottom central web 40 extends the full length of base 10 centrally thereof and merges with end extensions 42, 44 that have inclined fastener receiving openings 42a, 44a therein for receiving fasteners such as nails or screws to attach support A against the inside surface of a concrete form.

A plurality of support legs have generally horizontal portions that extend outwardly from base 10 and web 40, and generally vertical portions that extend in a direction that is opposite from the direction in which the spring clips extend. Each leg 50, 51, 52 and 53 terminates in a flat end 50a, 51a, 52a and 53a, all of which lie in a common plane and also lie in a common plane with flat ends 42b, 44b of fastener receiving extensions 42, 44.

In the arrangement shown and described, the spring clips are sized for holding one-half inch, three-quarter inch and one inch trade size electrical nonmetallic tubing which is referred to in the trade and in this application as ENT tubing. The spring clips may be sized and configured for resiliently gripping trade size ENT tubing received therein or may be sized and configured to simply retain trade size ENT tubing therein once a tube is snapped through a narrow entrance opening.

One-half inch corrugated ENT tubing has a nominal outside diameter of around 0.840 inches that may vary from 0.832 inches to 0.848 inches. Three-quarter inch corrugated ENT tubing has a nominal outside diameter of around 1.050 inches that may vary from 1.040 inches to 1.060 inches. One inch corrugated ENT tubing has a nominal outside diameter of around 1.315 inches that may vary from 1.305 inches to 1.325 inches. Obviously, the spring clips may be sized and configured for holding other tubing or conduit sizes or for holding other items.

Support legs 50 and 51 on one side of support A are centrally aligned with outer pairs of spring clips 24, 26 and 18, 20. On the opposite side of support A, support legs 52, 53 are located on opposite sides of the central pair of spring clips 12, 14, with leg 52 located midway between central clip pair 12, 14 and outer clip pair 24, 26, while support leg 53 is located midway between central spring clip pair 12, 14 and outer spring clip pair 18, 20.

The support legs 50–53 extend generally horizontally outwardly from base 10 a significant distance to provide enhanced stability for the support. The vertical portions of the legs terminate in small end areas so as to minimize their footprint at the outer surface of a finished concrete wall or floor. By way of example, the end area of each leg may be less than 0.20 inches.

Figure 7:
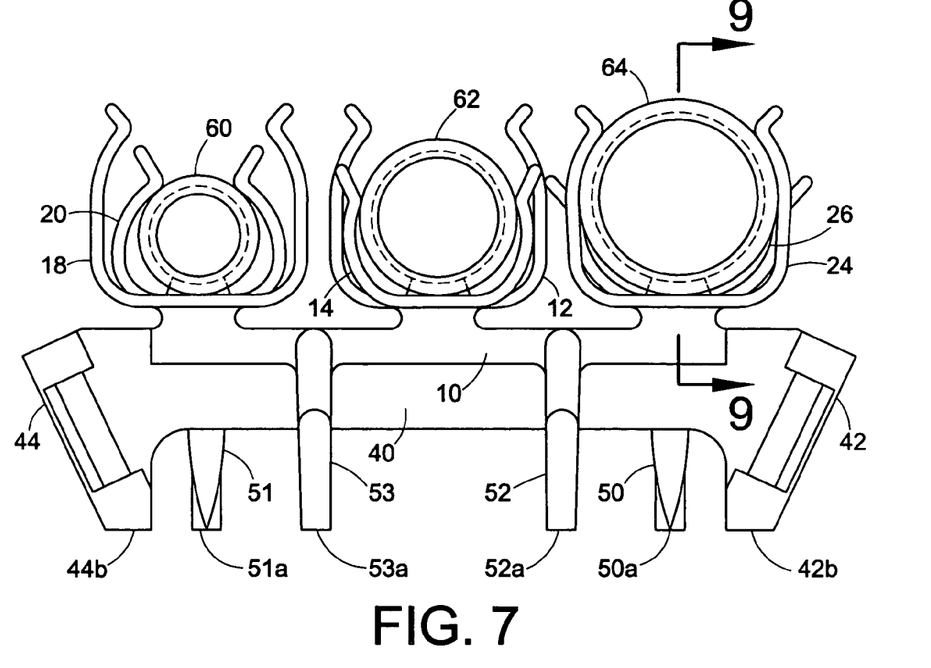
FIG. 7 is an elevational view from one side of the support showing ENT tubing of different sizes received in spring clips.
Figure 8:
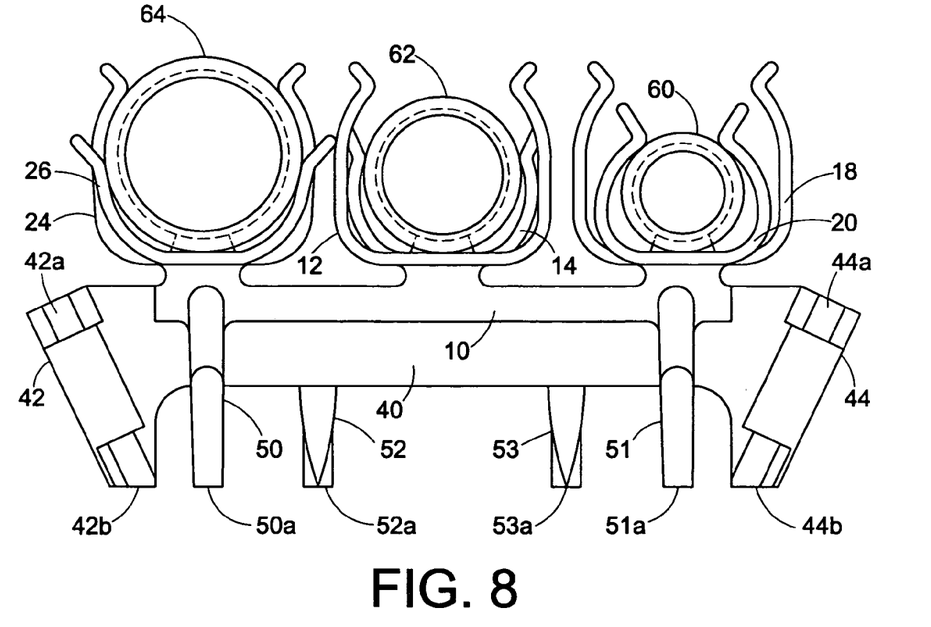
FIG. 8 is an elevational view from the opposite side of FIG. 7.

FIGS. 7 and 8 show one-half inch, three-quarter inch, and one inch trade size ENT tubing 60, 62 and 64 received in the spring clips. One-half inch trade size conduit 60 is received within small spring clip 20 with the legs thereof under bending stress and engaging the outer surface of the tube well above its centerline. The small tube extends freely through the longitudinally aligned larger spring clip 18.

Three-quarter inch trade size ENT tube 62 is received within small spring clip 14 with the spring legs thereof under significant bending stress and the inner end portions of the curved legs engaging the outer surface of tube 62 above its horizontal centerline to retain the tube within and between the spring legs. Three-quarter inch tube 62 extends freely through large spring clip 12.

One inch trade size ENT tube 64 is resiliently gripped above its horizontal centerline between the inwardly curved end portions of the spring legs on large clip 24. One inch ENT tube 64 extends through small spring clip 26 as shown in FIG. 8 with the legs of the small spring clip bent outwardly and not being in retaining relationship with tube 64.

Obviously, the dimensioning may be such that at least the one-half inch and one inch trade size ENT tubes are relatively loosely held by the small and large spring clips while being retained therein by the narrowed entrance openings and the close proximity of the inturned end portions of the spring arms.

It will be recognized that each pair of longitudinally aligned large and small spring clips may be used for receiving and retaining either a one-half inch trade size ENT tube, a three-quarter inch trade size ENT tube or a one inch trade size ENT tube.

ENT tubing is corrugated so that it has spaced-apart circumferential grooves along its length. As shown in FIG. 9, projection 30 is received in a circumferential groove 70 in ENT tube 64 that is retained by large spring clip 24. It will be recognized that the other sizes of ENT tubing that are retained within the spring clips also are prevented against longitudinal movement relative to support A by having a projection 30, 32 or 34 received within a tube circumferential groove as shown in FIG. 9. The projections enable tensioning the tubing between spaced supports A to prevent the tube from sagging or bowing toward an inner surface of a concrete form. Obviously, projections may be provided at other locations on the spring clips for reception in tube corrugations.

Figure 10:
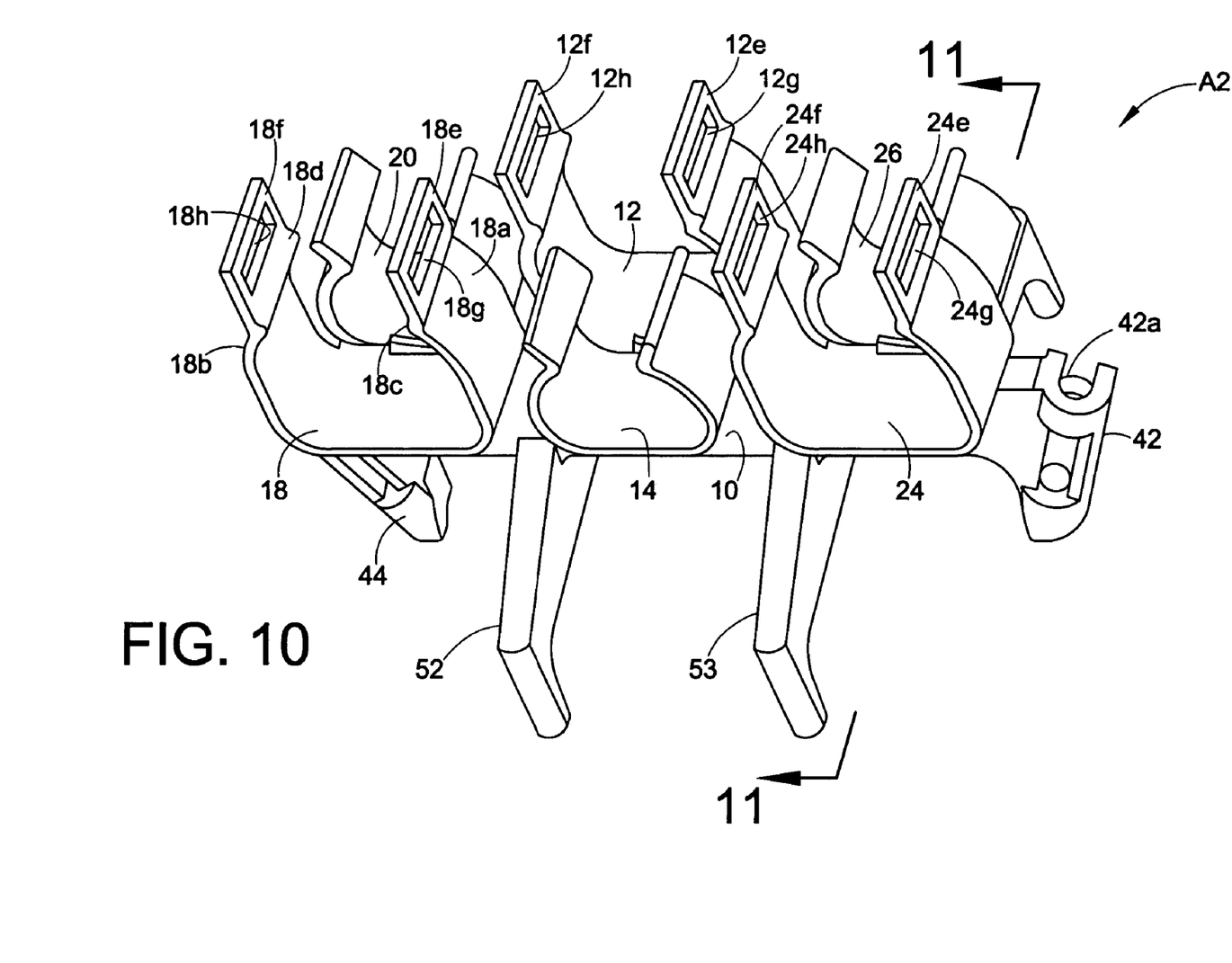
FIG. 10 is a perspective illustration of another embodiment.
Figure 11:
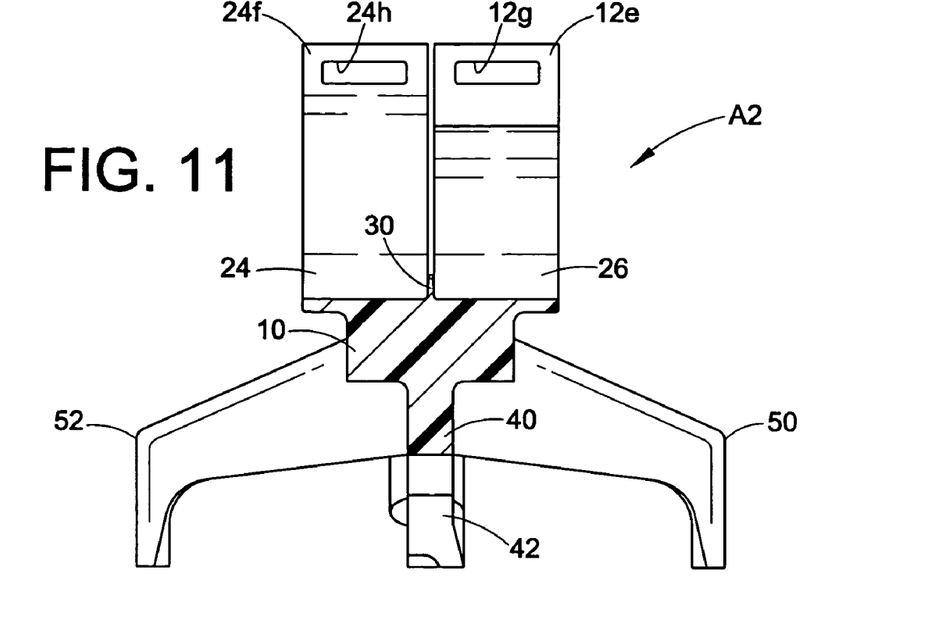
FIG. 11 is a cross-sectional elevational view taken generally on line 11—11 of FIG. 10.
Figure 12:
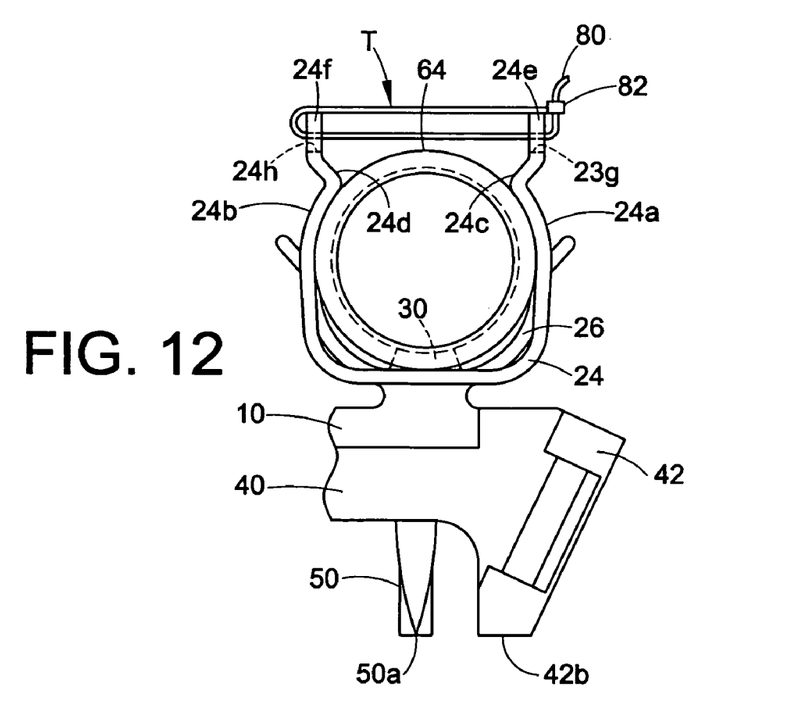
FIG. 12 is a partial end elevational view showing a pair of spring arms on one spring clip connected together by a cable tie.

FIGS. 10–12 show a modified support bracket A2 that is similar to support bracket A except for modification of at least the large spring clips by configuring their spring arms for attaching a connecting device thereto that spans the spring arms above a conduit that is received within the spring arms.

In one arrangement, the opposite spring arms on at least the large spring clips are structurally configured to be connected together with a flexible cable tie or the like by being provided with extensions as shown at 18e and 18f for large spring clip 18 in FIG. 10. Extensions 18e, 18f extend upwardly beyond the outwardly and upwardly inclined cam surfaces that are located on opposite sides of the entrance opening to a spring clip. Thus, the extensions are spaced-apart a greater distance than the width of the entrance opening to a large spring clip.

The flat extensions have the same width as the spring arms, extend generally parallel to one another, and are provided with openings 18g, 18h. In the arrangement shown, the openings are generally rectangular, but other configurations are possible. The spring arms on at least large spring clips 12 and 24 also are provided with the same kind of extensions 12e, 12f, 24e, 24f having openings 12g, 12h, 24g, 24h therethrough for receiving a cable tie or the like.

FIG. 12 shows a corrugated ENT tube 64 received within large spring clip 24. A flexible plastic cable tie T is extended through openings 24g, 24h in extensions 24e, 24f, and the tail end portion 80 of the tie is extended through a hole in an enlarged head 82 on the tie in a known manner. Longitudinally-spaced transverse ratchet teeth on the elongated cable tie strap portion cooperate with a pawl that projects into the hole in head 82 for preventing withdrawal of the strap from the head in a known manner. The tie T spans the end portions of the spring arms above the tube 64 to hold the tube within the clip. The tie may be tightened to pull the spring arms of the spring clip together to more tightly grip a conduit between the spring arms and hold it in position with a projection 30, 32, 34 received in a tube corrugation. Obviously, other types of spring arm connecting devices or ties may be used, including wire twist ties.

FIG. 12 shows the entrance opening to large spring clip 24 across the intersections between cam surfaces 24c, 24d and the inwardly curved end portions of spring arms 24a, 24b. Thus, generally parallel extensions 24c, 24f are spaced-apart a greater distance than the width of an entrance opening to a large spring clip.

As shown in FIG. 12, spring arms 24a, 24b are configured so that tie T extends straight across the arms above the tube 64 without having to be curved across the top of the tube. This facilitates installation of a tie by a workperson when compared to an arrangement in which the tie must be threaded through one spring arm and then curved upwardly over the tube and downwardly through the other spring arm. Openings 24g, 24h are spaced far enough above a large tube 64 that is held in the large clip to permit straight across connection of the spring arms. Obviously, this simply is a desirable arrangement, and other less efficient arrangements are possible, including those in which the tie is only slightly curved in engagement with the tube or in which the tie has significant curvature in engagement with the tube.

FIGS. 13–19 show a modified support bracket A' that is similar to support bracket A except for modification of at least the large spring clips by configuring their spring arms for attaching a connecting device thereto that spans the spring arms above a conduit that is received within the spring arms.

Figure 13:
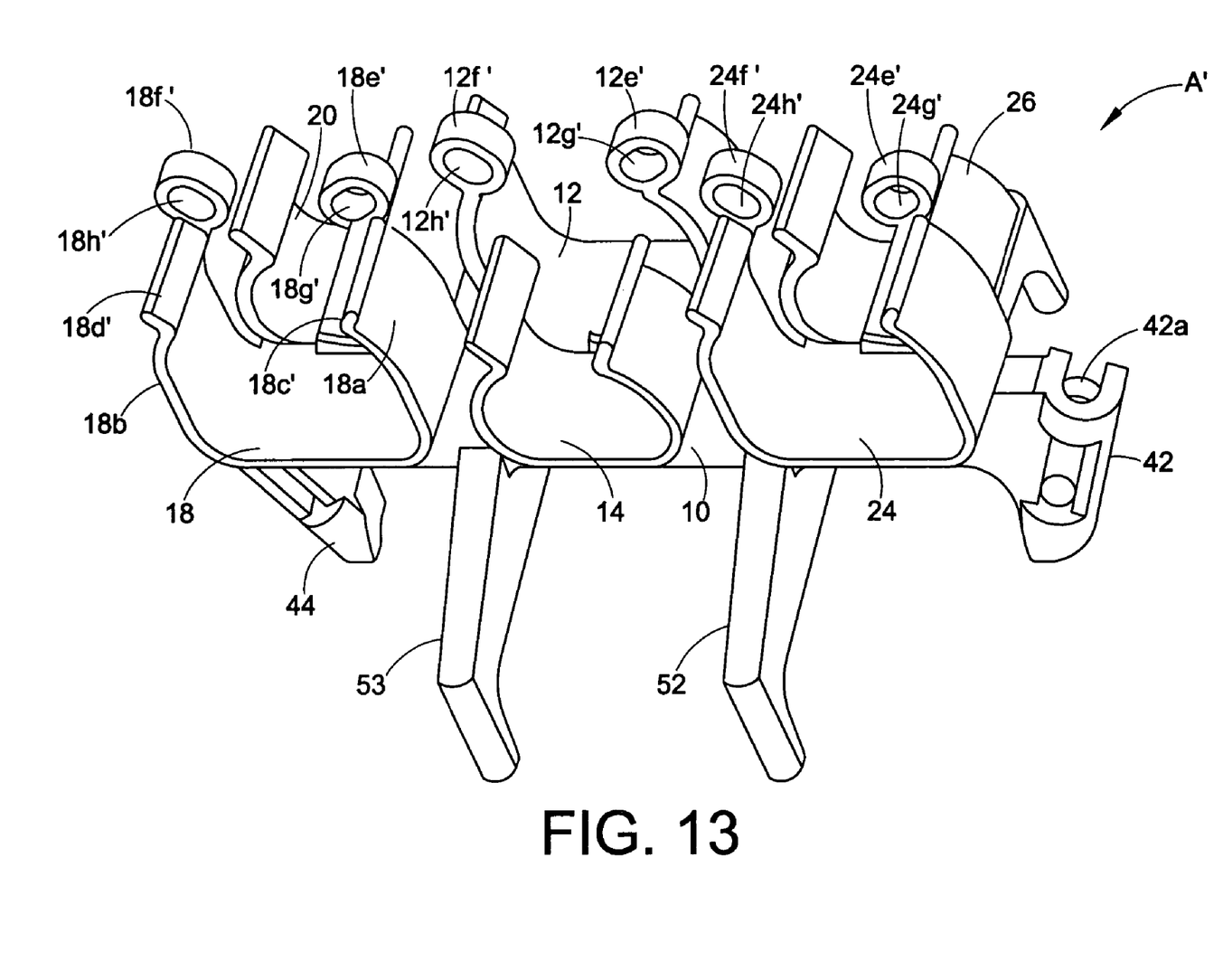
FIG. 13 is a perspective illustration of another embodiment.
Figure 14:
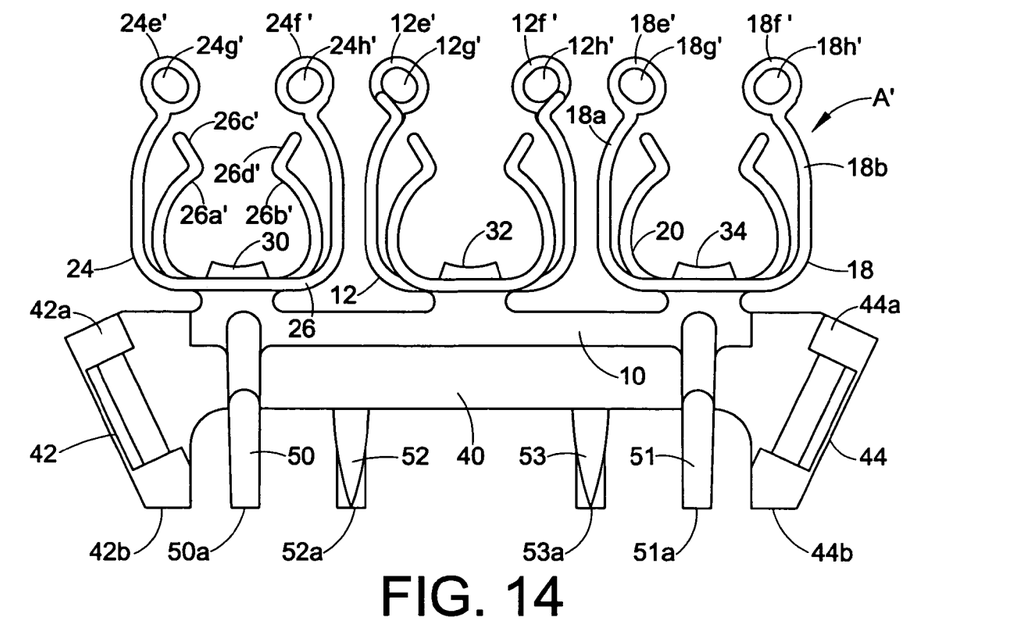
FIG. 14 is a side elevational view of one side thereof.
Figure 15:
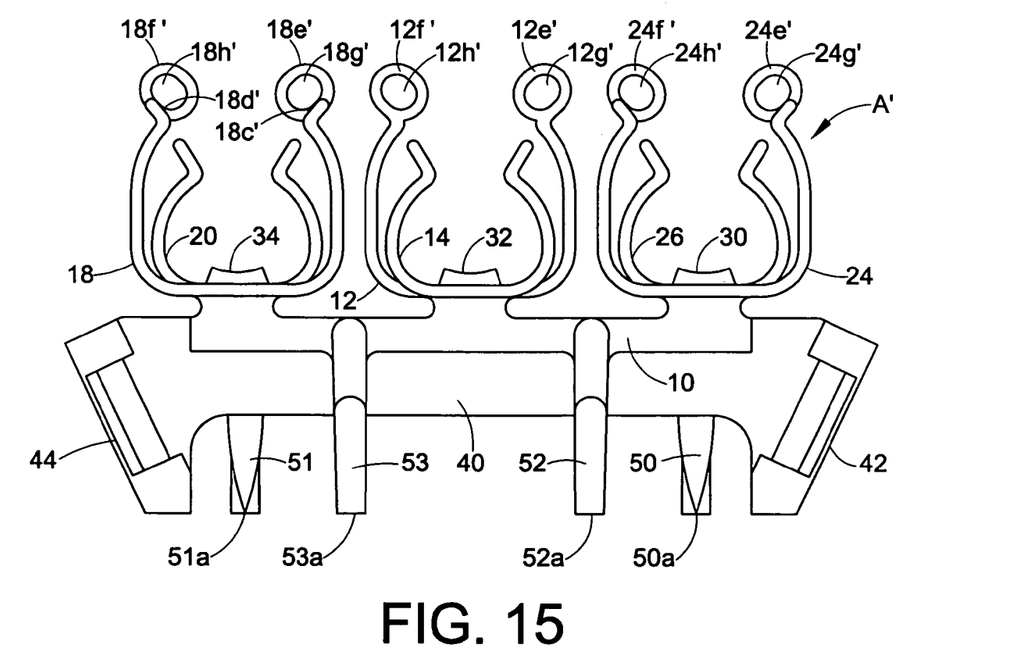
FIG. 15 is a side elevational view of the opposite side thereof.
Figure 16:
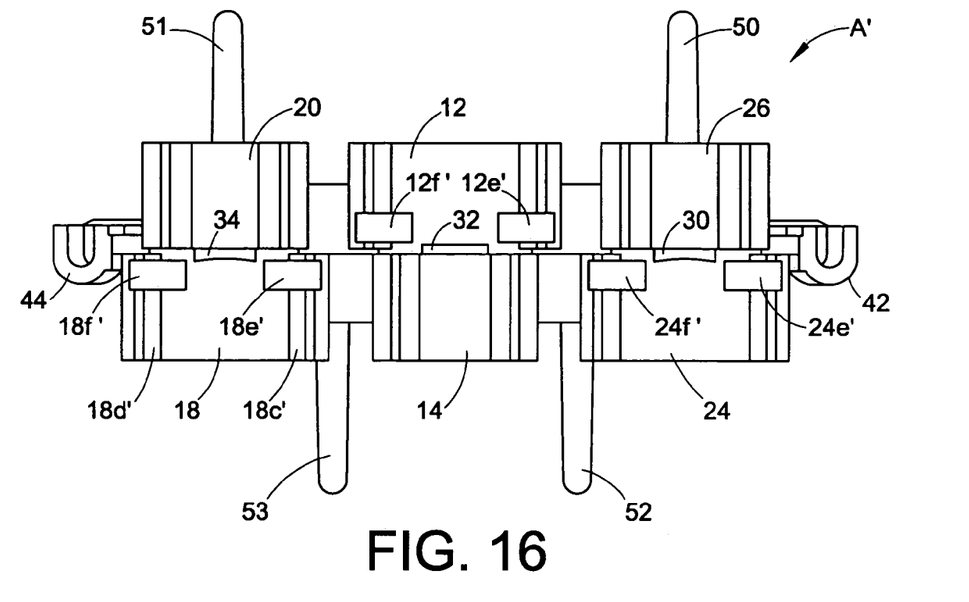
FIG. 16 is a top plan view thereof.
Figure 17:
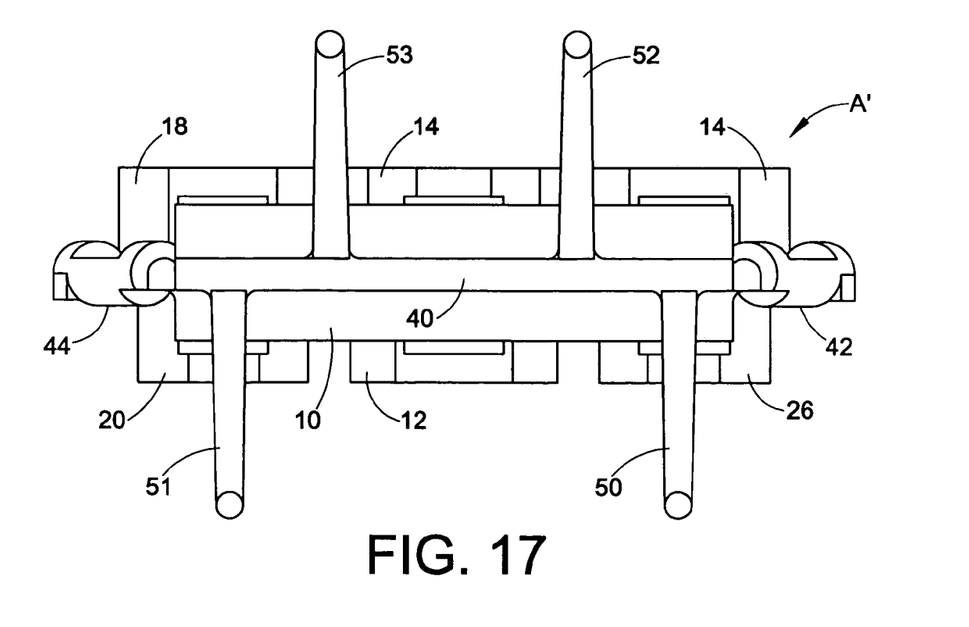
FIG. 17 is a bottom view thereof.
Figure 18:
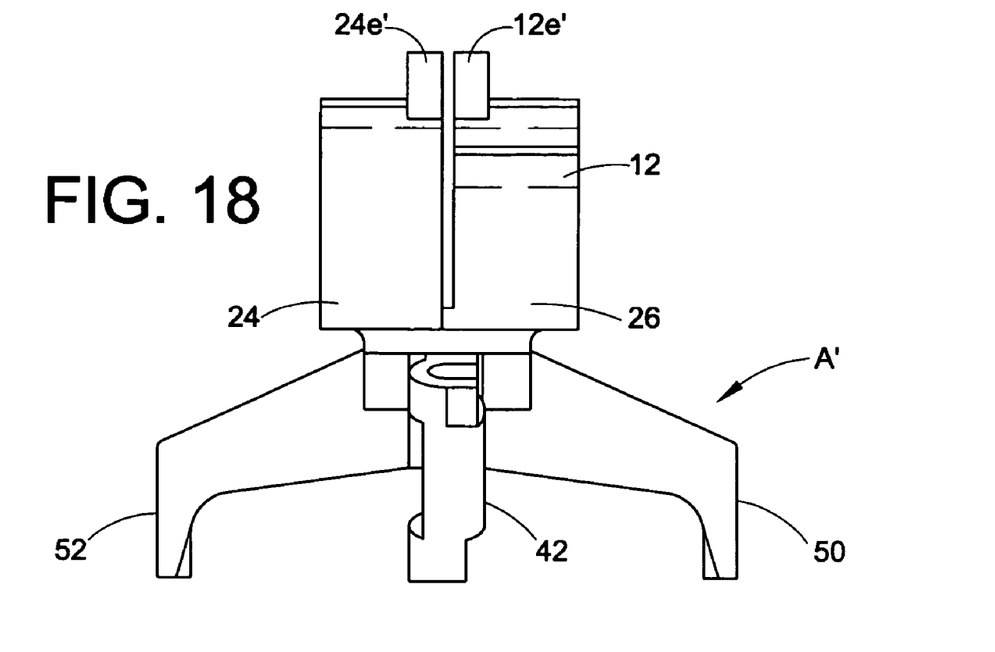
FIG. 18 is an elevational view of one end thereof.
Figure 19:
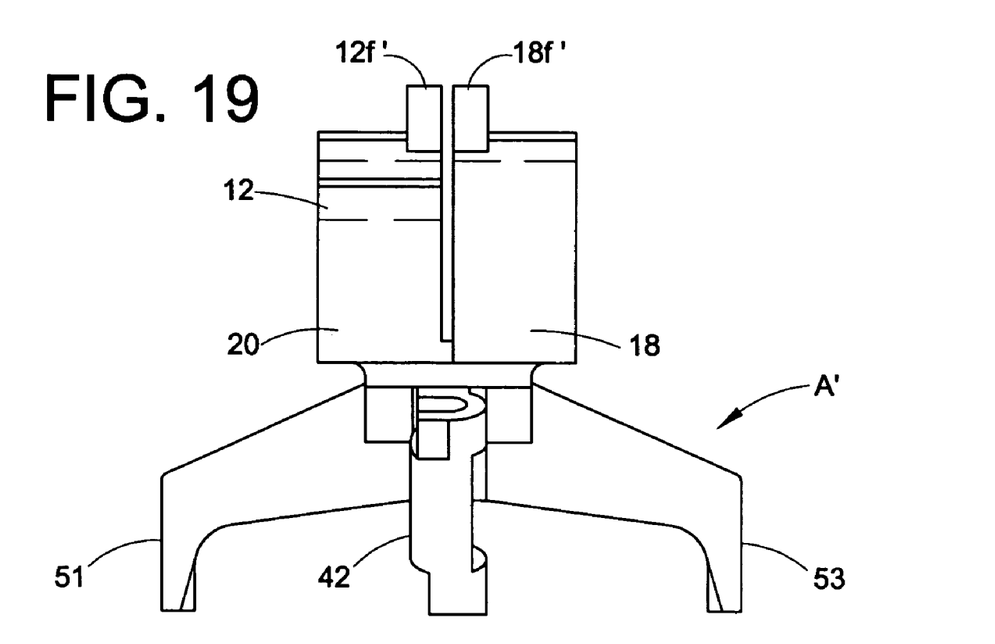
FIG. 19 is an elevational view of the opposite end thereof.

In the arrangement of FIGS. 13–19, the opposite spring arms on at least the large spring clips are structurally configured to be connected together with a flexible cable tie or the like by being provided with extensions as shown at 18e' and 18f' for large spring clip 18 in FIGS. 13–15.

Extensions 18e', 18f' are generally circular or oval shaped, with generally circular or oval openings 18g', 18h' having axes that extend generally parallel to the axes of tubes that are received in the U-shaped spring clips.

Extensions 18e', 18f' occupy less than one-half the width of the spring arms on spring clip 18 and are located at the inner ends of the arms adjacent to aligned smaller spring clip 20. Extensions 18e', 18f' extend into the space between the ends of the spring arms 18a, 18b so that the entrance opening to the spring clip is narrowed. The extensions are curved as best shown in FIGS. 14 and 15 to provide cam surfaces that facilitate insertion of a tube between the spring clip arms.

A cable tie or the like is receivable through openings 18g', 18h' above a conduit to hold a tube within a clip in the manner explained with reference to FIG. 12. The tie may be tightened to bend the spring arms toward one another to grip the tube.

The spring arms on at least large spring clips 12 and 24 also are provided with the same kind of extensions 12e', 12f', 24e' and 24f' having openings 12g', 12h', 24g' and 24h' therethrough for receiving a cable tie or the like.

Although the improvements of this application have been shown and described with reference to representative embodiments, it is obvious that alterations and modifications will occur to others skilled in the art upon the reading and understanding of this disclosure. Therefore, it is to be understood that the improvements may be practiced otherwise than as specifically described herein while remaining within the scope of the claims.

What is claimed is:

1. A support for supporting ENT tubing in spaced relationship to a surface of a concrete form comprising:
   a bracket molded in one-piece of plastic material;
   said bracket having at least two aligned large and small generally U-shaped spring clips with entrance openings that open outwardly in the same direction;
   said bracket having a base on which said spring clips are supported in closely adjacent spaced-apart relationship;
   the large clip being larger than the small clip and being configured and sized for retaining one inch trade size ENT tubing therein;
   the small clip being smaller than the large clip and being configured and sized for retaining one-half inch or three-quarter inch trade size ENT tubing therein;
   the large and small spring clips being aligned so that an ENT tube that extends through one spring clip also extends through the other spring clip;

a one-half or three-quarter inch trade size ENT tube that is retained by the small clip extending freely through the large clip; and a one inch trade size ENT tube that is retained by the large clip extending through the small clip in engagement therewith.

2. The support of claim 1 wherein said clips open outwardly in one direction and said bracket has a plurality of spaced-apart support legs extending therefrom with generally horizontal leg portions that extend outwardly from said bracket in the general direction in which said large and small clips are aligned, and said generally horizontal portions terminating in generally vertical leg portions that extend in an opposite direction from said one direction.

3. The support of claim 2 wherein said bracket includes fastener receiving openings independent of said legs for receiving fasteners to secure the bracket to a surface.

4. The support of claim 1 wherein said bracket includes inclined fastener receiving openings for receiving fasteners to secure the bracket to a surface.

5. The support of claim 1 wherein said clips are for retaining corrugated ENT tubing having external circumferential grooves therein, and a projection between said large and small clips for reception in an external circumferential groove of an ENT tube that is retained in said clips to prevent longitudinal movement of the ENT tube relative to the bracket.

6. The support of claim 1 wherein there are at least two pair of aligned large and small spring clips positioned side-by-side, the spring clips in one pair being reversely positioned relative to the spring clips in the other pair so that the large clip in one pair is adjacent to the small clip in the other pair and the small clip in the one pair is adjacent to the large clip in the other pair.

7. The support of claim 1 wherein said bracket has a central body portion and said spring clips extend outwardly from one side of said central body portion, a plurality of spaced-apart support legs extending outwardly from the opposite side of said central body portion, and fastener receiving openings at opposite ends of said central body portion.

8. The support of claim 1 wherein there are at least three pair of aligned large and small spring clips including a middle pair and an outer pair on each opposite side of said middle pair, said middle pair being reversely positioned with respect to the outer pairs so that the large clip on the middle pair is adjacent the small clips on the outer pairs and the small clip on the middle pair is adjacent the large clips on the outer pairs.

9. The support of claim 1 including a projection between each pair of large and small clips for reception in an external circumferential groove of an ENT tube that is received in a clip to prevent longitudinal movement of the tube relative to the bracket.

10. The support of claim 1 wherein only said large clip has clip extensions that are connectable by a connecting element that spans the clip extensions above an ENT tube that is receivable in the large clip to hold the tube within the large clip.

11. The support of claim 10 wherein said clip extensions have clip extension openings therethrough and said connecting element is a tie that is receivable through said clip extension openings.

12. The support of claim 11 wherein said clip extension openings have opening axes that extend generally parallel to the longitudinal axis of an ENT tube that is receivable in said large clip.

13. The apparatus of claim 10 wherein said large clip has end portions that are inclined toward one another and outwardly inclined portions that are inclined outwardly from said inwardly inclined portions, and said clip extensions being on said outwardly inclined portions.

14. The apparatus of claim 13 wherein said clip extensions are generally parallel.

15. The apparatus of claim 10 wherein said large clip has a large clip width and said extensions occupy less than one-half of said large clip width.

16. The apparatus of claim 15 wherein said extensions are located adjacent to the small clip that is aligned with the large clip.

17. Apparatus for supporting corrugated ENT tubing having external circumferential grooves comprising:

a bracket molded in one-piece of plastic material;

said bracket having at least one pair of retaining structures thereon of different sizes for retaining different sizes of ENT tubing on the bracket;

said pair of retaining structures being aligned so that an ENT tube that is retained by one retaining structure also extends through the other retaining structure; and a projection on the bracket located between the two retaining structures for reception in an external circumferential groove of an ENT tube that is retained by either of the retaining structures to prevent longitudinal movement of the tube relative to the bracket;

said retaining structures comprising generally U-shaped spring clips, each clip having a bottom and a pair of spaced-apart spring arms extending upwardly from said bottom, said projection extending upwardly from said bottom in the same direction as said arms between the pair of clips;

clip extensions on said spring arms that are connectable by a connecting element that spans the clip extensions above an ENT tube that is receivable within and between the spring arms to hold the ENT tube within the spring arms;

said clips including large and small clips of different size, said large clip having a large clip width in a direction parallel to the longitudinal axis of an ENT tube receivable between the spring arms; and, said extensions occupying less than one-half of said clip width.

18. The apparatus of claim 17 wherein said clip extensions have clip extension openings therethrough and said connection element is a tie that is receivable through said clip extension openings.

19. The apparatus of claim 18 wherein said clip extension openings extend generally parallel to the longitudinal axis of an ENT tube receivable between the spring arms.

20. A conduit support comprising:

a bracket having a plurality of side-by-side pairs of generally U-shaped spring clips for receiving and retaining conduit therein;

the spring clips in each pair including a large spring clip and a small spring clip for receiving and retaining different sizes of conduit therein, the large spring clip being larger than the small spring clip for retaining large conduit therein and the small spring clip being smaller than the large spring clip for retaining small conduit therein that is smaller than the large conduit;

the spring clips in each pair being aligned so that a conduit received and retained in one clip also extends through the other clip; and each pair of spring clips being reversely positioned relative to an adjacent pair of spring clips so that a large clip in one pair is adjacent a small clip in an adjacent pair and a small clip in the one pair is adjacent a large clip in the adjacent pair.

21. The support of claim 20 wherein the spring clips receive and retain corrugated ENT tubing having external circumferential grooves therein, and at least one projection associated with each pair of clips for reception in an external groove of an ENT tube held by a clip to prevent longitudinal movement of the tube relative to the bracket.

22. Apparatus for supporting conduit in spaced relationship to a supporting surface comprising:
 a bracket having a generally flat base with opposite sides and opposite ends;
 at least one generally U-shaped spring clip on said base for receiving a conduit and retaining same on the bracket;
 a plurality of spaced-apart support legs having generally horizontal leg portions extending generally horizontally outwardly from said opposite sides of said base and terminating in generally vertical leg portions that extend in a direction opposite from the clip;
 a plurality of fastener receiving openings at said opposite ends of said base for receiving fasteners to secure the bracket to a support surface engaged by the support legs; and,
 said fastener receiving openings being in bracket extensions that project outwardly from opposite ends of the bracket and the openings are inclined inwardly.

23. The apparatus of claim 22 wherein the support legs and the bracket extensions have support surface engaging ends that lie in a common plane.

* * * * *